(12) United States Patent
DiBenedetto et al.

(10) Patent No.: US 11,306,604 B2
(45) Date of Patent: Apr. 19, 2022

(54) HPC CASE CLEARANCE CONTROL THERMAL CONTROL RING SPOKE SYSTEM

(71) Applicant: Raytheon Technologies Corporation, Farmington, CT (US)

(72) Inventors: Enzo DiBenedetto, Berlin, CT (US); Paul E. Coderre, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 18 days.

(21) Appl. No.: 16/848,475

(22) Filed: Apr. 14, 2020

(65) Prior Publication Data
US 2021/0317749 A1   Oct. 14, 2021

(51) Int. Cl.
*F01D 11/18* (2006.01)
*F01D 25/12* (2006.01)

(52) U.S. Cl.
CPC .............. *F01D 11/18* (2013.01); *F01D 25/12* (2013.01); *F05D 2240/55* (2013.01); *F05D 2270/42* (2013.01)

(58) Field of Classification Search
CPC .......... F01D 11/18; F01D 11/08; F01D 25/12; F05D 2240/55; F05D 2270/42
See application file for complete search history.

(56) References Cited

U.S. PATENT DOCUMENTS

| | | |
|---|---|---|
| 4,251,185 A | 2/1981 | Karstensen |
| 4,565,492 A | 1/1986 | Bart et al. |
| 4,766,723 A | 8/1987 | Newton |
| 4,863,345 A | 9/1989 | Thompson et al. |

(Continued)

FOREIGN PATENT DOCUMENTS

| | | |
|---|---|---|
| EP | 3034810 A1 | 6/2016 |
| GB | 2206651 A | 1/1989 |

(Continued)

OTHER PUBLICATIONS

EP Search Report dated Aug. 18, 2021 issued for related European Patent Application No. 21168381.8.

*Primary Examiner* — Courtney D Heinle
*Assistant Examiner* — Ryan C Clark
(74) *Attorney, Agent, or Firm* — Bachman & LaPointe, P.C.

(57) ABSTRACT

A case clearance control system comprising a blade outer air seal support structure having a plurality of protrusions extending radially from the blade outer air seal support structure opposite a blade outer air seal proximate the blade outer air seal support structure; a thermal control ring coupled to the blade outer air seal support structure, the thermal control ring including a plurality of receivers configured to couple with the plurality of protrusions; a thermal break formed between the plurality of protrusions and the plurality of receivers, the thermal break configured to control heat transfer between the blade outer air seal support structure and the thermal control ring; and a plurality of flow passages formed between the blade outer air seal support structure, the thermal control ring and the plurality of protrusions, the plurality of flow passages configured to allow cooling air flow to condition the thermal control ring and maintain thermal control ring dimensions.

17 Claims, 3 Drawing Sheets

(56) References Cited

U.S. PATENT DOCUMENTS

| | | | |
|---|---|---|---|
| 5,593,278 A | 1/1997 | Jourdain et al. | |
| 5,685,158 A | 11/1997 | Lenahan et al. | |
| 5,961,278 A | 10/1999 | Dorais et al. | |
| 6,935,836 B2 | 8/2005 | Ress, Jr. et al. | |
| 9,200,530 B2 | 12/2015 | McCaffrey | |
| 9,835,171 B2 | 12/2017 | Kimmel et al. | |
| 9,963,990 B2 * | 5/2018 | Vetters | F01D 9/04 |
| 9,976,435 B2 | 5/2018 | Borja et al. | |
| 10,132,187 B2 | 11/2018 | Tatman et al. | |
| 10,316,683 B2 | 6/2019 | Palmer | |
| 10,683,770 B2 * | 6/2020 | Freeman | F01D 5/284 |
| 2004/0033105 A1 * | 2/2004 | North | F16B 5/0241 |
| | | | 403/408.1 |
| 2015/0377035 A1 * | 12/2015 | Freeman | F01D 25/246 |
| | | | 416/191 |
| 2016/0312643 A1 | 10/2016 | Davis et al. | |
| 2016/0326900 A1 | 11/2016 | Borja | |
| 2017/0292398 A1 * | 10/2017 | Wasserman | F01D 5/12 |
| 2018/0030846 A1 * | 2/2018 | McCaffrey | F01D 11/22 |
| 2018/0340440 A1 | 11/2018 | Freeman et al. | |
| 2019/0112947 A1 * | 4/2019 | Walston | F01D 25/246 |
| 2019/0264578 A1 * | 8/2019 | Walston | F01D 11/12 |

FOREIGN PATENT DOCUMENTS

| | | |
|---|---|---|
| JP | 2014001685 A | 1/2014 |
| WO | 7901008 A1 | 11/1979 |

\* cited by examiner

HPC CASE CLEARANCE CONTROL THERMAL CONTROL RING SPOKE SYSTEM

BACKGROUND

The present disclosure is directed to a high pressure compressor case clearance control system, and more particularly to a blade outer air seal thermal control ring having spokes conditioned by clearance control air.

Gas turbine engines provide power by compressing air using a compressor, adding fuel to this compressed air, combusting this mixture such that it expands through the blades of a turbine and exhausting the produced gases. The turbine consists of a disc, rotating about the central shaft of the engine, and a plurality of blades extending radially out of the disc towards the engine casing of the engine. Expansion of the combustion gases through the turbine causes its blades to rotate at high speed and the turbine, in turn, drives the compressor.

The distance between the tips of the blades and the inner surface of the compressor casing is known as the tip clearance. It is desirable for the tips of the blades to rotate as close to the casing without rubbing as possible because as the tip clearance increases, a portion of the compressed gas flow will pass through the tip clearance decreasing the efficiency of the compressor. This is known as over-tip leakage. The efficiency of the compressor, which partially depends upon tip clearance, directly affects the specific fuel consumption (SFC) of the engine. Accordingly, as tip clearance increases, SFC also rises.

As the disc and the blades rotate, centrifugal and thermal loads cause the disc and blades to extend in the radial direction. The casing also expands as it is heated but there is typically a mismatch in radial expansion between the disc/blades and the casing. Specifically, the blades will normally expand radially more quickly than the housing, reducing the tip clearance and potentially leading to "rubbing" as the tips of the blade come into contact with the interior of the casing. Over time in use, the casing heats up and expands away from the blade tip, increasing the tip clearance. This may result in a tip clearance at stabilized cruise conditions that is larger than desired resulting in poor efficiency.

Conventionally, tip clearances are set when the engine is cold to allow for radial extension of the disc and blades due to centrifugal and thermal loads, to prevent rubbing. This means that there is initially a large tip clearance, such that the engine is relatively inefficient. When the engine is running, the blades will eventually extend radially to close this clearance, making the engine run more efficiently. Over a longer period of time, however, the temperature of the casing will rise and the casing will expand radially, which will again increase the tip clearance.

The running tip clearance of the high-pressure compressor (HPC) of an aircraft engine has a significant bearing on the efficiency of the HPC module. This, in turn, impacts other module attributes such as turbine durability as well as the engine fuel burn metric. Consequently, much effort has been expended in ensuring that the running tip clearance is at the smallest mechanically feasible value.

There is a desire to improve the efficiency, operability and durability of gas turbine high pressure compressors. A major factor to achieve increased efficiency and operability is to reduce the clearance between the blade tips and their corresponding blade outer air seals (BOAS), at a desired mission point, usually the cruise condition.

SUMMARY

In accordance with the present disclosure, there is provided a case clearance control system comprising a blade outer air seal support structure having a plurality of protrusions extending radially from the blade outer air seal support structure opposite a blade outer air seal proximate the blade outer air seal support structure; a thermal control ring coupled to the blade outer air seal support structure, the thermal control ring including a plurality of receivers configured to couple with the plurality of protrusions; a thermal break formed between the plurality of protrusions and the plurality of receivers, the thermal break configured to control heat transfer between the blade outer air seal support structure and the thermal control ring; and a plurality of flow passages formed between the blade outer air seal support structure, the thermal control ring and the plurality of protrusions, the plurality of flow passages configured to allow cooling air flow to condition the thermal control ring and maintain thermal control ring.

A further embodiment of any of the foregoing embodiments may additionally and/or alternatively include the thermal control ring comprises a material composition comprising a coefficient of thermal expansion less than the blade outer air seal support structure and the blade outer air seal.

A further embodiment of any of the foregoing embodiments may additionally and/or alternatively include the protrusions are formed integrally with the blade outer air seal support structure.

A further embodiment of any of the foregoing embodiments may additionally and/or alternatively include the protrusions comprise a base portion proximate the blade outer air seal support and an end portion radially distal from the base portion.

A further embodiment of any of the foregoing embodiments may additionally and/or alternatively include the end portion and the receiver are configured in a shape of a dovetail fitting that maintains the thermal break.

A further embodiment of any of the foregoing embodiments may additionally and/or alternatively include the protrusions are spaced apart with a distance of from not less than 3.5 degrees to not more than 20 degrees.

A further embodiment of any of the foregoing embodiments may additionally and/or alternatively include the thermal beak is configured to inhibit thermal energy transfer from the blade outer air seal support structure to the thermal control ring.

In accordance with the present disclosure, there is provided aa case clearance control system comprising a blade outer air seal support structure configured to support a blade outer air seal proximate a tip of a blade of a gas turbine high pressure compressor, the blade outer air seal support structure including a plurality of protrusions projecting radially outward from the blade outer air seal support structure opposite the blade outer air seal; a thermal control ring coupled to the blade outer air seal support structure at the plurality of protrusions, the thermal control ring including a plurality of receivers configured to couple with the plurality of protrusions; a thermal break formed between the plurality of protrusions and the plurality of receivers, the thermal break configured to control heat transfer between the blade outer air seal support structure and the thermal control ring; and a plurality of flow passages formed between the blade outer air seal support structure, the thermal control ring and the plurality of protrusions, the plurality of flow passages configured to allow cooling air flow to pass through and cool the thermal control ring in order to maintain thermal control ring dimensions to control expansion and contraction of the blade outer air seal support structure.

A further embodiment of any of the foregoing embodiments may additionally and/or alternatively include the protrusions are formed spaced apart around a circumference of the blade outer air seal support structure.

A further embodiment of any of the foregoing embodiments may additionally and/or alternatively include the thermal control ring is configured to add thermal mass to the blade outer air seal.

A further embodiment of any of the foregoing embodiments may additionally and/or alternatively include the cooling air flow thermally conditions the thermal control ring.

A further embodiment of any of the foregoing embodiments may additionally and/or alternatively include the thermal beak is configured to inhibit thermal energy transfer from the blade outer air seal support structure to the thermal control ring.

A further embodiment of any of the foregoing embodiments may additionally and/or alternatively include the protrusions can be configured at least one of tapped to receive threaded fasteners inserted radially through the thermal control ring or receive pins insertable bayonet style with the thermal control ring.

In accordance with the present disclosure, there is provided a process for maintaining a tip clearance with a case clearance control system comprising attaching a thermal control ring to a blade outer air seal support structure, the blade outer air seal support structure configured to support a blade outer air seal proximate a tip of a blade of a gas turbine high pressure compressor, wherein the blade outer air seal support structure includes a plurality of protrusions extending radially from the blade outer air seal support structure opposite the blade outer air seal, the thermal control ring including a plurality of receivers configured to couple with the plurality of protrusions; forming a thermal break between the plurality of protrusions and the plurality of receivers, the thermal break configured to control heat transfer between the blade outer air seal support structure and the thermal control ring; and flowing cooling air through a plurality of flow passages formed between the blade outer air seal support structure, the thermal control ring and the plurality of protrusions, wherein the cooling air cools the thermal control ring for maintaining the thermal control ring dimensions to control expansion and contraction of the blade outer air seal support structure, controlling the tip clearance.

A further embodiment of any of the foregoing embodiments may additionally and/or alternatively include the process further comprising thermally conditioning the thermal control ring such that the thermal control ring thermally decouples from a transient gas turbine engine operation.

A further embodiment of any of the foregoing embodiments may additionally and/or alternatively include the process further comprising inhibiting the thermal energy transferred from a core gas path flow into the blade outer air seal support structure into the thermal control ring, maintaining a stable shape in the thermal control ring in the absence of thermal growth or thermal contraction.

A further embodiment of any of the foregoing embodiments may additionally and/or alternatively include the process further comprising coupling the plurality of receivers with the plurality of protrusions by use of a dovetail fitting.

A further embodiment of any of the foregoing embodiments may additionally and/or alternatively include the process further comprising dimensioning the thermal control ring to cooperate with the flow passages for flowing the cooling air over and between the thermal control ring and the blade outer air seal support structure; and maintaining a structural integrity of the thermal control ring during a gas turbine engine transient response.

A further embodiment of any of the foregoing embodiments may additionally and/or alternatively include the process further comprising flowing the cooling air through the flow passages and the thermal break proximate the at least one protrusion and the at least one receiver.

A further embodiment of any of the foregoing embodiments may additionally and/or alternatively include the at least one protrusion comprises a base portion proximate the blade outer air seal support and an end portion radially distal from the base portion, the receiver comprises a corresponding shape with the end portion, the receiver comprises a larger dimension than the end portion configured to promote the thermal break.

Other details of the case clearance control system are set forth in the following detailed description and the accompanying drawings wherein like reference numerals depict like elements.

DETAILED DESCRIPTION

Figure 1:
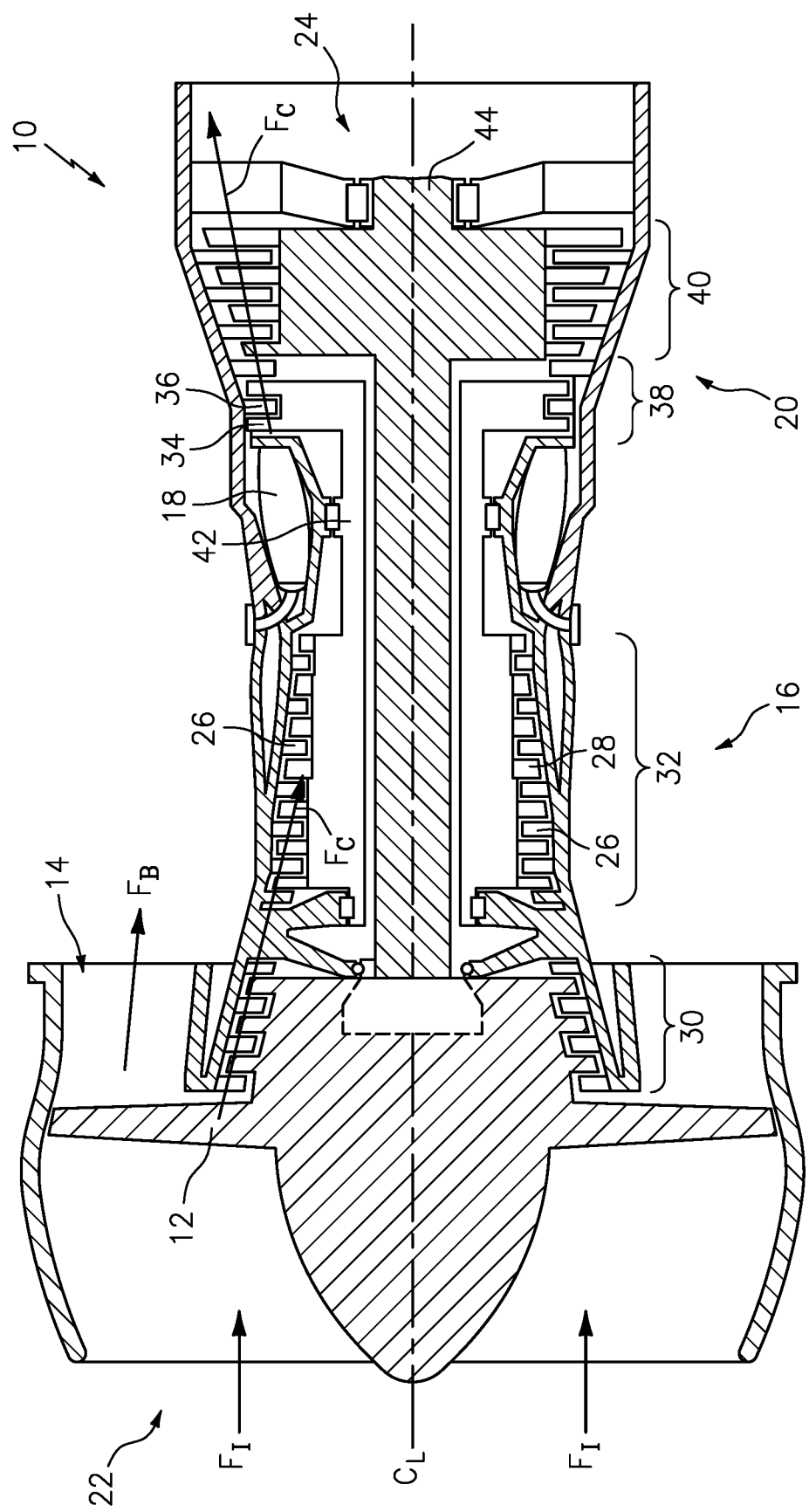
FIG. 1 is a simplified cross-sectional view of a gas turbine engine.

FIG. 1 is a simplified cross-sectional view of a gas turbine engine 10 in accordance with embodiments of the present disclosure. Turbine engine 10 includes fan 12 positioned in bypass duct 14. Turbine engine 10 also includes compressor section 16, combustor (or combustors) 18, and turbine section 20 arranged in a flow series with upstream inlet 22 and downstream exhaust 24. During the operation of turbine engine 10, incoming airflow $F_1$ enters inlet 22 and divides into core flow $F_C$ and bypass flow $F_B$, downstream of fan 12. Core flow $F_C$ continues along the core flowpath through compressor section 16, combustor 18, and turbine section 20, and bypass flow $F_B$ proceeds along the bypass flowpath through bypass duct 14.

Compressor 16 includes stages of compressor vanes 26 and blades 28 arranged in low pressure compressor (LPC) section 30 and high pressure compressor (HPC) section 32. Turbine section 20 includes stages of turbine vanes 34 and turbine blades 36 arranged in high pressure turbine (HPT) section 38 and low pressure turbine (LPT) section 40. HPT section 38 is coupled to HPC section 32 via HPT shaft 42, forming the high pressure spool. LPT section 40 is coupled to LPC section 30 and fan 12 via LPT shaft 44, forming the low pressure spool. HPT shaft 42 and LPT shaft 44 are typically coaxially mounted, with the high and low pressure spools independently rotating about turbine axis (centerline) $C_L$.

Combustion gas exits combustor 18 and enters HPT section 38 of turbine 20, encountering turbine vanes 34 and turbines blades 36. Turbine vanes 34 turn and accelerate the flow of combustion gas, and turbine blades 36 generate lift for conversion to rotational energy via HPT shaft 42, driving HPC section 32 of compressor 16. Partially expanded combustion gas flows from HPT section 38 to LPT section 40, driving LPC section 30 and fan 12 via LPT shaft 44. Exhaust flow exits LPT section 40 and turbine engine 10 via exhaust nozzle 24. In this manner, the thermodynamic efficiency of turbine engine 10 is tied to the overall pressure ratio (OPR), as defined between the delivery pressure at inlet 22 and the compressed air pressure entering combustor 18 from compressor section 16. As discussed above, a higher OPR offers increased efficiency and improved performance. It will be appreciated that various other types of turbine engines can be used in accordance with the embodiments of the present disclosure.

Figure 2:
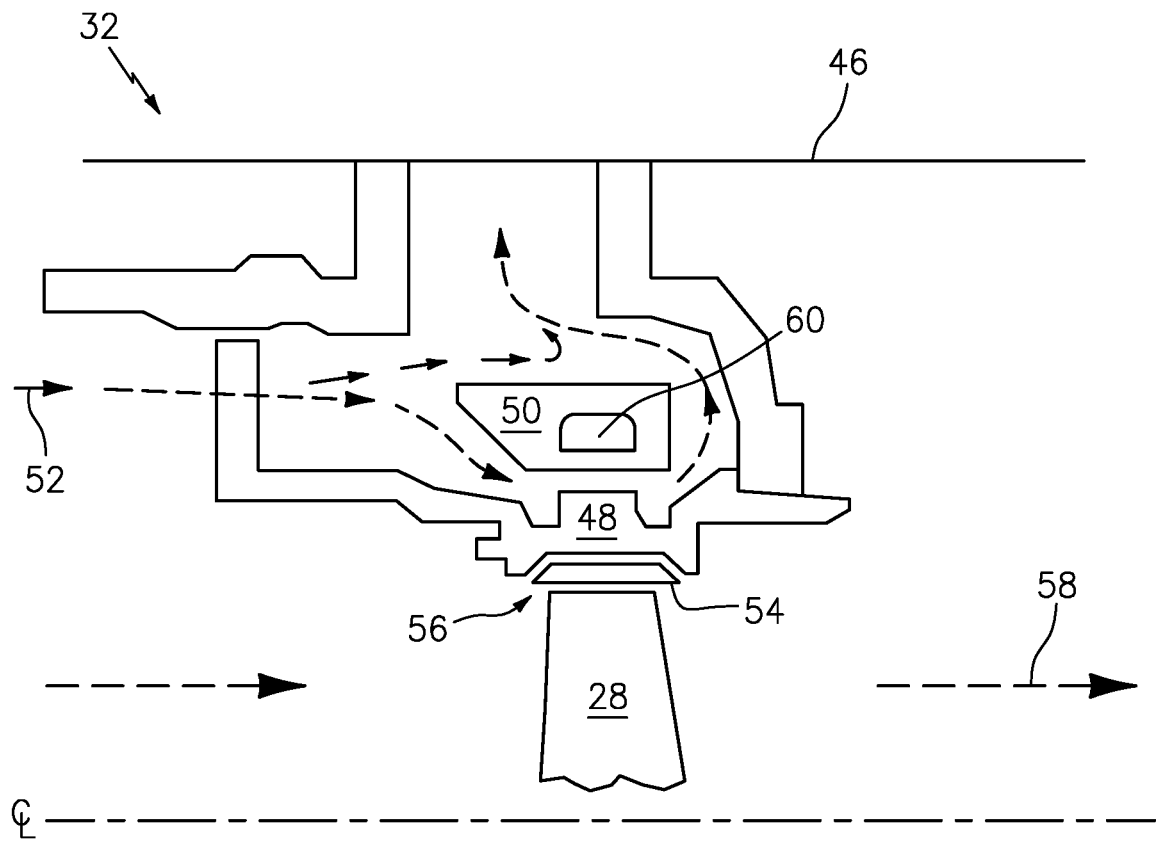
FIG. 2 is a simplified cross-sectional view of a gas turbine engine proximate an exemplary high pressure compressor section.

Referring also to FIG. 2, an exemplary portion of the gas turbine high pressure compressor section 32 is shown. The compressor section 32 disclosed can achieve a technical effect through a thermal contraction (or inhibit thermal expansion) of the case 46 and blade outer air seal (BOAS) support structure 48 through the use of a thermal control ring 50 in conjunction with cooling air 52 in cooperation with the blade outer air seal (BOAS) support structure 48.

The blade outer air seal support structure 48 supports a blade outer air seal 54. The blade outer air seal 54 interacts with the blade 28 to maintain a tip clearance 56 between the blade outer air seal 54 and blade 28. The control of the tip clearance 56 can be accomplished by actively conditioning the thermal control ring 50 in the high pressure compressor section 32 using cooler upstream bleed air, i.e., cooling air 52. The tip clearance control for the high pressure compressor section 32 can be influenced by core gas path 58 heat transfer into the blade outer air seal 54 and support structure 48. During transient engine conditions, such as speed deceleration followed by rapid speed acceleration, the core gas path flow 58 can experience rapid variation in temperature under these transients, such that a mismatch in radial thermal growth between the blade outer air seal 54 and the blade 28 tips occurs. When the mismatch occurs at a re-acceleration condition of maximum radial growth of the blade 28 tips, and minimum radial growth of the blade outer air seal 54, the running tip clearance 56 between the blade outer air seal 54 and blade 28 will become negative and excessive blade outer air seal 54 abradable rub will occur. Prior art designs for this condition by sizing the tip clearance at a large enough value to prevent occurrence, but this also reduces compressor efficiency.

Figure 3:
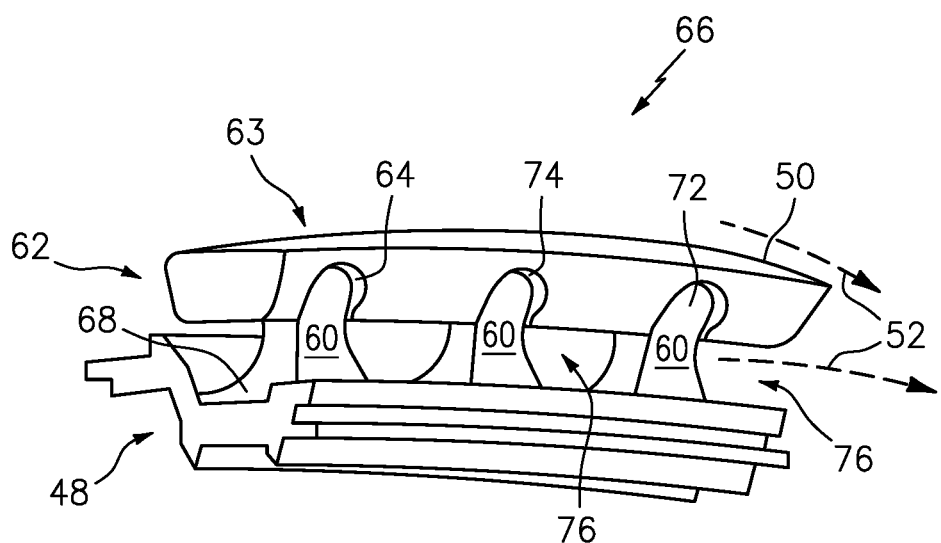
FIG. 3 is a simplified isometric view of an exemplary blade outer air seal support structure and thermal control ring.
Figure 4:
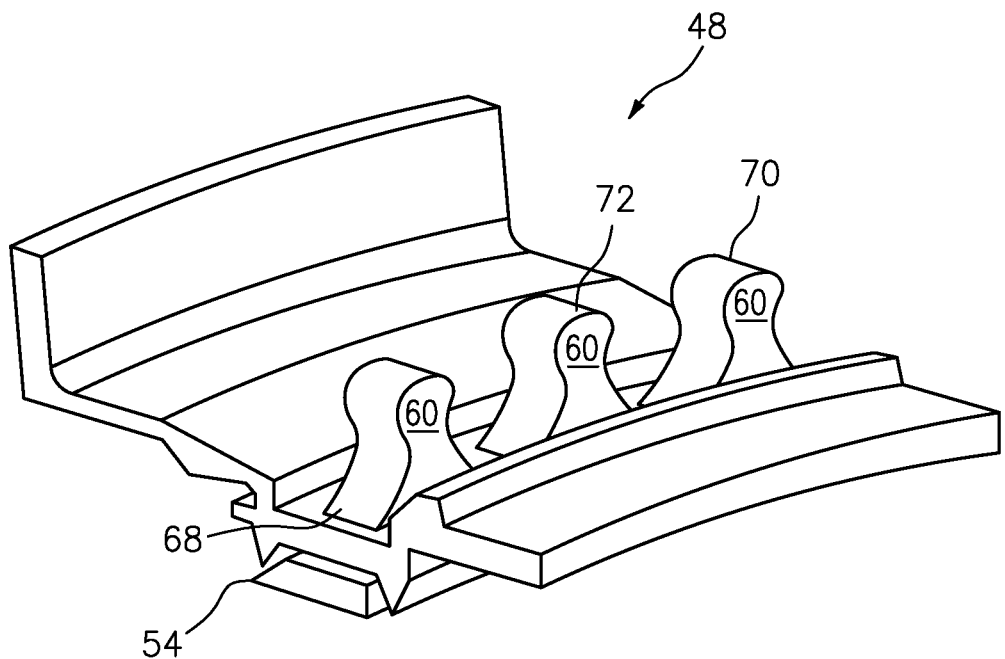
FIG. 4 is an isometric view of the exemplary blade outer air seal support structure of FIG. 3.

Referring also to FIG. 3 and FIG. 4, the thermal control ring 50 attached to the blade outer air seal support structure 48 adds circumferential thermal mass to the blade outer air seal support structure 48.

Additionally, the thermal control ring 50 is coupled to the blade outer air seal support structure 48 at multiple protrusions or spokes 60. The thermal control ring 50 can be coupled to the blade outer air seal support structure 48 radially opposite the blade outer air seal 54 at the rear 62 of the support structure 48. Coupling 63 between the thermal control ring 50 and the blade outer air seal support structure 48 can be configured as a thermal break 64 to reduce the heat transfer between the thermal control ring 50 and the blade outer air seal support structure 48. The thermal break 64 can include additional low alpha, low heat transfer materials, coatings, inserts as well as air gaps. The combination of the thermal control ring 50 coupled to the blade outer air seal support structure 48 acts to control the expansion and contraction behavior of the blade outer air seal support structure 48 relative to the tip clearance 56 and other compressor section components subjected to the core gas path flow 58 temperature fluctuations.

The cooling air 52 thermally conditions the thermal control ring 50 and provides a more consistent thermal profile during engine operations, thermally decoupled from the transient nature of the core gas flow path 58. The combination of the thermal control ring 50 coupled to the blade outer air seal support structure 48 and cooling air 52 provides for a case clearance control system 66.

In order to control the thermal growth deflection of certain BOAS in the high pressure compressor section 32, such as, rear stage BOAS, and provide the thermal break 64 to minimize the core gas path flow 58 thermal convection and conduction heat transfer from the BOAS support structure 48, the protrusions 60 can be formed integral to and projecting radially outward from the BOAS support structure 48. The protrusions 60 can be formed around the entire circumference of the BOAS support structure 48.

In an exemplary non-limiting embodiment, the protrusions 60 can have a base portion 68 proximate the BOAS support structure 48 and an end portion 70 extending distally from the BOAS support structure 70. The end portion 70 can be shaped accordingly to provide for a secure coupling between the thermal control ring 50 and the BOAS support structure 48 while allowing for the thermal break 64 between the thermal control ring 50 and the BOAS support structure 48. The thermal break 64 is understood to be configured to inhibit/reduce the heat transfer between the thermal control ring 50 and the BOAS support structure 48. The thermal break 64 inhibits the thermal energy being transferred from the relatively hot core gas path flow 58 through the BOAS support structure 48 to the thermal control ring 50, thus allowing the thermal control ring 50 to maintain a relatively stable shape due to thermal growth/contraction. The thermal control ring 50 can be formed from low alpha materials that have low thermal conductance, as opposed to the BOAS support structure 48 which can be formed of high alpha materials that has good thermal conductive properties.

In an exemplary embodiment the end portion 70 can couple with the thermal control ring 50 by use of a dovetail fitting 72. The end portion 70 can be shaped as a bulbous form that interlocks with a receiver 74 of similar shape formed in the thermal control ring 50. The receiver 74 can correspond with the shape of the end portion 70 with a larger dimension to allow for a loose fit between the end portion 70 and receiver 74. The loose fit can promote the thermal break 64 in the form of an air gap and allow for the movement of the cooling air 52 to pass over the end portion 70 and through the receiver 74. The receiver 74 and end portion 70 shapes can be optimized to minimize mechanical or thermal stresses based on the materials used in construction.

The protrusions 60 can be dimensioned so as to form flow passages 76 that allow for the cooling air 52 to flow between each protrusion 60 and between the thermal control ring 50 and BOAS support structure 48, thus maintaining relatively stable dimensions in the thermal control ring 50. The flow passages 76 can be passages proximate the receiver 74 in addition to the thermal break 64.

The thermal control ring 50 can also be dimensioned to cooperate with the flow passages 76 optimizing the flow of cooling air 52 flowing over and between the thermal control ring 50 and BOAS support structure 48 while maintaining sufficient structural integrity in view of thermal and mechanical stresses to achieve the desired low thermal deflections during transient engine responses. The thermal control ring 50 and BOAS support structure 48 can be configured to expose both the OD and ID surfaces of the thermal control ring 50, to increase heat transfer. The thermal control ring 50 comprises a material composition with a coefficient of thermal expansion that is less than the blade outer air seal 54 or blade outer air seal support structure 48 material. The thermal control ring 50 can be segmented or continuously formed as a hoop. The thermal control ring 50, if formed of a continuous hoop, can be configured to slide axially onto the protrusions 60 to couple with the BOAS support structure 48.

The protrusions 60 can be spaced apart sufficient to allow for cooling air 52 to pass between. In an exemplary non-limiting embodiment, the protrusions 60 can be spaced apart at a dimension of not less than 3.5 degrees to allow for sufficient cooling air 52 to flow and not more than about 20 degrees to prevent unwanted distortion in the BOAS support structure 48.

Figure 5:
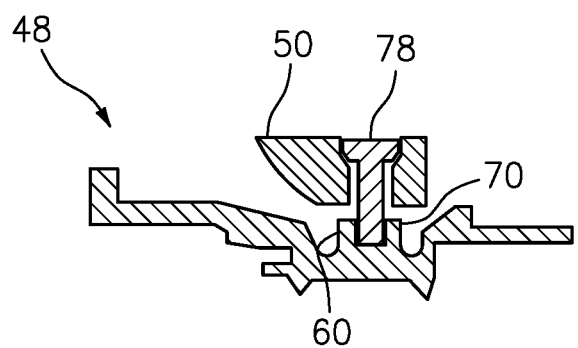
FIG. 5 is a simplified cross-sectional view of an exemplary blade outer air seal support structure and thermal control ring.

In an exemplary embodiment the protrusions 60 can be configured to receive threaded fasteners and/or posts 78 that can be inserted radially through the thermal control ring 50 into the protrusions 60 at the end portion 70 and configured to secure the thermal control ring 50 to the BOAS support structure 48, as seen in FIG. 5.

Figure 6:
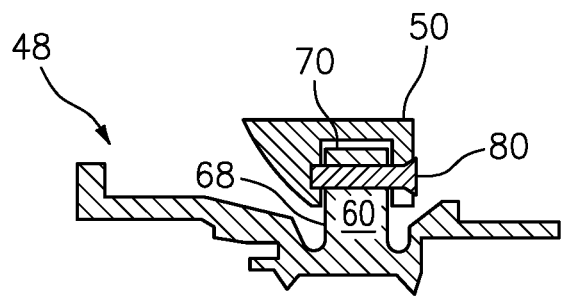
FIG. 6 is a simplified cross-sectional view of an exemplary blade outer air seal support structure and thermal control ring.

In an exemplary embodiment the protrusions 60 can be configured to receive pins or double shear rivets 80 that can be inserted bayonet style with the thermal control ring 50 into the protrusions 60 proximate the end portion 70 and configured to secure the thermal control ring 50 to the BOAS support structure 48, as seen in FIG. 6.

The disclosed case clearance control system provides the technical advantage of allowing for the cooling air to dominate the thermal growth and control deflections during transient engine conditions preventing heavy rub conditions.

The disclosed case clearance control system provides the technical advantage of enabling tighter tip clearances during operating conditions.

The disclosed case clearance control system provides the technical advantage of controlling thermal growth deflection in the BOAS by use of a thermal control ring having thermal breaks between protrusions integral to the BOAS support structure and cooling air passages between the protrusions, thermal control ring and BOAS support structure.

The disclosed case clearance control system provides the technical advantage of controlling BOAS contraction during transient engine speed conditions.

The disclosed case clearance control system provides the technical advantage of decoupling the mass within the compressor by conditioning a thermal control ring and thermally breaking the thermal control ring from the BOAS support structure.

The disclosed case clearance control system provides the technical advantage of having the thermal control ring to dominate BOAS radial growth instead of the core gas path flow thermal influences.

There has been provided a tip clearance control system. While the case clearance control system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A case clearance control system comprising:
a blade outer air seal support structure having a plurality of protrusions extending radially from the blade outer air seal support structure opposite a blade outer air seal proximate said blade outer air seal support structure, wherein each of said plurality of protrusions comprise a base portion proximate said blade outer air seal support and an end portion radially distal from said base portion;
a thermal control ring coupled to said blade outer air seal support structure, said thermal control ring including a plurality of receivers configured to couple with said plurality of protrusions;
a thermal break formed between said plurality of protrusions and said plurality of receivers, said thermal break configured to control heat transfer between said blade outer air seal support structure and said thermal control ring; and
a plurality of flow passages formed between said blade outer air seal support structure, said thermal control ring and said plurality of protrusions, said plurality of flow passages configured to allow cooling air flow to condition said thermal control ring and maintain thermal control ring dimensions; wherein said end portions and said plurality of receivers are configured in a shape of a dovetail fitting with each of the end portions being shaped as a bulbous form that interlocks with each of the plurality of receivers of similar shape formed in the thermal control ring that maintains said thermal break.

2. The case clearance control system according to claim 1, wherein said thermal control ring comprises a material composition comprising a coefficient of thermal expansion less than said blade outer air seal support structure and said blade outer air seal.

3. The case clearance control system according to claim 1, wherein said protrusions are formed integrally with said blade outer air seal support structure.

4. The case clearance control system according to claim 1, wherein the plurality of receivers correspond with the shape of the end portions with a larger dimension to allow for a loose fit between the end portions and the plurality of receivers, the loose fit configured to promote the thermal break in the form of an air gap and configured to allow for the movement of the cooling air to pass over the end portions and through the plurality of receivers.

5. The case clearance control system according to claim 1, wherein said protrusions are spaced apart with a distance of from not less than 3.5 degrees to not more than 20 degrees.

6. The case clearance control system according to claim 1, wherein said thermal break is configured to inhibit thermal energy transfer from said blade outer air seal support structure to said thermal control ring.

7. A case clearance control system comprising:
a blade outer air seal support structure configured to support a blade outer air seal proximate a tip of a blade of a gas turbine high pressure compressor, said blade outer air seal support structure including a plurality of protrusions projecting radially outward from said blade outer air seal support structure opposite said blade outer air seal;
a thermal control ring coupled to said blade outer air seal support structure at said plurality of protrusions, said thermal control ring including a plurality of receivers configured to couple with said plurality of protrusions, wherein said protrusions can be configured tapped to receive threaded fasteners inserted radially through the thermal control ring;

a thermal break formed between said plurality of protrusions and said plurality of receivers, said thermal break configured to control heat transfer between said blade outer air seal support structure and said thermal control ring; and a plurality of flow passages formed between said blade outer air seal support structure, said thermal control ring and said plurality of protrusions, said plurality of flow passages configured to allow cooling air flow to pass through and cool said thermal control ring in order to maintain thermal control ring dimensions to control expansion and contraction of said blade outer air seal support structure.

8. The case clearance control system according to claim 7, wherein said protrusions are formed spaced apart around a circumference of the blade outer air seal support structure.

9. The case clearance control system according to claim 7, wherein said thermal control ring is configured to add thermal mass to said blade outer air seal.

10. The case clearance control system according to claim 7, wherein said cooling air flow thermally conditions said thermal control ring.

11. The case clearance control system according to claim 7, wherein said thermal break is configured to inhibit thermal energy transfer from said blade outer air seal support structure to said thermal control ring.

12. A process for maintaining a tip clearance with a case clearance control system comprising:

attaching a thermal control ring to a blade outer air seal support structure, said blade outer air seal support structure configured to support a blade outer air seal proximate a tip of a blade of a gas turbine high pressure compressor, wherein said blade outer air seal support structure includes a plurality of protrusions extending radially from the blade outer air seal support structure opposite said blade outer air seal wherein each of said plurality of protrusions comprise a base portion proximate said blade outer air seal support and an end portion radially distal from said base portion, said thermal control ring including a plurality of receivers configured to couple with said plurality of protrusions, coupling said plurality of receivers with said plurality of protrusions by use of a dovetail fitting with each of the end portions being shaped as a bulbous form that interlocks with each of the plurality of receivers of similar shape formed in the thermal control ring;

forming a thermal break between said plurality of protrusions and said plurality of receivers, said thermal break configured to control heat transfer between said blade outer air seal support structure and said thermal control ring; and flowing cooling air through a plurality of flow passages formed between said blade outer air seal support structure, said thermal control ring and said plurality of protrusions, wherein said cooling air cools said thermal control ring for maintaining the thermal control ring dimensions to control expansion and contraction of said blade outer air seal support structure, controlling the tip clearance.

13. The process of claim 12, further comprising:
thermally conditioning said thermal control ring such that said thermal control ring thermally decouples from a transient gas turbine engine operation.

14. The process of claim 12, further comprising:
inhibiting the thermal energy transferred from a core gas path flow into the blade outer air seal support structure into the thermal control ring, maintaining a stable shape in the thermal control ring in the absence of thermal growth or thermal contraction.

15. The process of claim 12, further comprising:
dimensioning said thermal control ring to cooperate with said flow passages for flowing said cooling air over and between said thermal control ring and said blade outer air seal support structure; and
maintaining a structural integrity of said thermal control ring during a gas turbine engine transient response.

16. The process of claim 12, further comprising:
flowing said cooling air through said flow passages and said thermal break proximate said at least one protrusion and said at least one receiver.

17. The process of claim 12, wherein said at least one protrusion comprises a base portion proximate said blade outer air seal support and an end portion radially distal from said base portion, said receiver comprises a corresponding shape with said end portion, said receiver comprises a larger dimension than said end portion configured to promote said thermal break.

* * * * *